(12) United States Patent
Huang

(10) Patent No.: US 9,304,341 B2
(45) Date of Patent: Apr. 5, 2016

(54) SIGNAL PANEL FOR CHECKING IMAGES DISPLAYED ON LIQUID DISPLAY DEVICES

(71) Applicant: Shenzhen China Star Optoelectronics Technology Co., Ltd., Shenzhen, Guangdong (CN)

(72) Inventor: Guochuan Huang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 200 days.

(21) Appl. No.: 14/235,056

(22) PCT Filed: Dec. 24, 2013

(86) PCT No.: PCT/CN2013/090353
§ 371 (c)(1),
(2) Date: Jan. 25, 2014

(87) PCT Pub. No.: WO2015/089861
PCT Pub. Date: Jun. 25, 2015

(65) Prior Publication Data
US 2015/0261022 A1 Sep. 17, 2015

(30) Foreign Application Priority Data
Dec. 20, 2013 (CN) .......................... 2013 1 10706853

(51) Int. Cl.
*G01R 31/26* (2014.01)
*G02F 1/13* (2006.01)

(52) U.S. Cl.
CPC .................................. *G02F 1/1309* (2013.01)

(58) Field of Classification Search
None
See application file for complete search history.

(56) References Cited

U.S. PATENT DOCUMENTS

| 6,940,300 B1 * | 9/2005 | Jenkins | G09G 3/006 324/754.03 |
| 7,298,164 B2 * | 11/2007 | Chen | G09G 3/006 324/760.01 |
| 2006/0170775 A1 * | 8/2006 | Kim | G09G 3/006 348/181 |

FOREIGN PATENT DOCUMENTS

| CN | 201853462 U | 6/2011 |
| CN | 202256564 U | 5/2012 |

* cited by examiner

*Primary Examiner* — Paresh Patel
(74) *Attorney, Agent, or Firm* — Andrew C. Cheng

(57) ABSTRACT

A signal panel for checking images displayed on liquid crystal devices is disclosed. The signal panel includes: a power supply mainboard; a plurality of low voltage differential signaling plugs arranged on the power supply mainboard for directly engaging with the low voltage differential signaling sockets of the liquid crystal device; a plurality of low voltage differential signaling adapters arranged on the power supply mainboard for engaging with the low voltage differential signaling sockets of the liquid crystal device via the adapters; and a plurality of frequency-angle adjusting switches of the low voltage differential signals arranged on the power supply mainboard for adjusting frequency-angle parameters of the low voltage differential signals of the liquid crystal device. The signal panel can test the liquid crystal device without using connecting wires and signal generators, which effectively reduce the cost.

20 Claims, 2 Drawing Sheets

SIGNAL PANEL FOR CHECKING IMAGES DISPLAYED ON LIQUID DISPLAY DEVICES

BACKGROUND OF THE INVENTION

1. Field of the Invention

The present disclosure relates to product testing technology, and more particularly to a signal panel for checking images displayed on liquid crystal devices (LCDs).

2. Discussion of the Related Art

TFT-LCD (Thin Film Transistor Liquid Crystal Display) has been the most important displaying platform of current information technology and video products. The operating principle of TFT-LCD relates to by applying appropriate voltage to a liquid crystal layer between an array glass substrate and a color filter (CF) glass substrate such that the liquid crystals within the liquid crystal layer are twisted. Different transparent rates are achieved by applying different voltages.

In the LCD manufacturing process, in order to enhance the reliability of the assembled LCDs, high-temperature/aging and quality reliability experiments have to be conducted. Generally, voltage and signals are inputted to the products in the aging mode, and the light is turn on to display images, and wherein only the voltage with 12V and 3.3V have to be provided by a signal source.

During the high-temperature/aging experiments and reliability experiments, a huge amount of signal generators and signal lines provide the signals and the power source to the product, which results in a huge amount of wasted resource. In addition, it is not easy to operate and repair the signal generators and signal lines.

SUMMARY

In over to overcome the above problem, in one aspect, the signal panel for checking images displayed on liquid crystal device includes: a power supply mainboard; a plurality of low voltage differential signaling plugs arranged on the power supply mainboard for directly engaging with the low voltage differential signaling sockets of the liquid crystal device; a plurality of low voltage differential signaling adapters arranged on the power supply mainboard for engaging with the low voltage differential signaling sockets of the liquid crystal device via the adapters; and a plurality of frequency-angle adjusting switches of the low voltage differential signals arranged on the power supply mainboard for adjusting frequency-angle parameters of the low voltage differential signals of the liquid crystal device.

Wherein the plurality of low voltage differential signaling plugs are symmetrically arranged on a left lateral side and a right lateral side of the power supply mainboard.

Wherein the plurality of low voltage differential signaling adapters are arranged symmetrically on an up lateral side and a down lateral side of the power supply mainboard.

Wherein the plurality of frequency-angle adjusting switches of the low voltage differential signals are arranged in a row between the low voltage differential signaling adapters located on the up lateral side and the down lateral side of the power supply mainboard, and the plurality of frequency-angle adjusting switches of the low voltage differential signals are arranged close to the low voltage differential signaling plug located on the left lateral side of the power supply mainboard.

Wherein the signal panel further includes: a power inlet arranged on the power supply mainboard for receiving an external voltage; a power switch arranged on the power supply mainboard for turning on or off power of the signal panel; and a voltage converting switch arranged on the power supply mainboard for converting the external voltage when the voltage converting switch is turn on.

Wherein the signal panel further includes a power safety unit arranged on the power supply mainboard for preventing the signal panel from voltage overload or short connection.

Wherein the signal panel further includes: a power lamp arranged on the power supply mainboard for indicating whether the power switch is turn on; and wherein the turn-on power lamp indicates that the power switch is turn on.

Wherein the signal panel further includes: a power-in indicator arranged on the power supply mainboard for indicating whether the power inlet has received the external voltage; and wherein the turn-on power-in indicator indicates that the power inlet has received the external voltage.

Wherein the power switch is arranged between the frequency-angle adjusting switches arranged in a row manner and the low voltage differential signaling plug located on the right lateral side of the power supply mainboard, the power inlet is arranged between the power switch and the low voltage differential signaling plug located on the right lateral side of the power supply mainboard, the voltage converting switch is arranged between the power switch and the low voltage differential signaling adapter located on the down lateral side of the power supply mainboard, the power lamp is arranged between the frequency-angle adjusting switches of the low voltage differential signals arranged in a row manner and the low voltage differential signaling adapter located on the down lateral side of the power supply mainboard, the power lamp is arranged close to the low voltage differential signaling plug located on the left lateral side of the power supply mainboard, the power-in indicator is arranged between the power lamp and the voltage converting switch, and the power safety unit is arranged between the voltage converting switch and the low voltage differential signaling plug located on the right lateral side of the power supply mainboard.

Wherein a positive-in socket of the power inlet electrically connects to one end of the power safety unit, the other end of the power safety unit electrically connects to one end of the power switch and connects to one end of the power-in indicator, the other end of the power-in indicator electrically connects to a first sheet set of the second low voltage differential signaling adapter, electrically connects to one end of the power lamp, and electrically connects to a first sheet set of a first low voltage differential signaling adapter; the other end of the power lamp electrically connects to a second sheet set of the first low voltage differential signaling adapter, electrically connects to the second sheet set of the first low voltage differential signaling plug, and electrically connects to the other end of the power switch; a negative-in socket of the power inlet electrically connects to the second sheet set of the second low voltage differential signaling plug, and electrically connects to the other end of the power-in indicator; one end of the voltage converting switch electrically connects to the other end of the power switch, electrically connects to the first sheet set of the second low voltage differential signaling plug, and electrically connects to the second sheet set of the second low voltage differential signaling adapter; one end of the first frequency-angle adjusting switch of the low voltage differential signals, one end of the second frequency-angle adjusting switch of the low voltage differential signals, one end of the third frequency-angle adjusting switch of the low voltage differential signal, one end of the fourth frequency-angle adjusting switch of the low voltage differential signal, one end of the fifth fourth frequency-angle adjusting switch of the low voltage differential signal, and one end of the sixth fourth frequency-angle adjusting switch of the low voltage differential signal electrically connect to the other end of the voltage converting switch; the other end of the first frequency-angle adjusting switch of the low voltage differential signals electrically connects to the first sheet of the first low voltage differential signaling plug; the other end of the second frequency-angle adjusting switch of the low voltage differential signals electrically connects to the second sheet of the first low voltage differential signaling plug; the other end of the fourth frequency-angle adjusting switch of the low voltage differential signal electrically connects to a third sheet of the first low voltage differential signaling plug; the other end of the third frequency-angle adjusting switch of the low voltage differential signal electrically connects to the first sheet of the first low voltage differential signaling adapter; the other end of the fifth fourth frequency-angle adjusting switch of the low voltage differential signal electrically connects to the first sheet of the second low voltage differential signaling adapter; and the other end of the sixth fourth frequency-angle adjusting switch of the low voltage differential signal electrically connects to the first sheet of the second low voltage differential signaling plug.

In view of the above, the signal panel can test the liquid crystal device without using connecting wires and signal generators, which effectively reduce the cost. In addition, the signal panel assembles different low voltage differential signaling plugs and adaptors such that the liquid crystal devices with different dimension and models can be tested. In this way, the cost is reduced and the operation is easy.

DETAILED DESCRIPTION OF THE EMBODIMENTS

Embodiments of the invention will now be described more fully hereinafter with reference to the accompanying drawings, in which embodiments of the invention are shown.

Figure 1:
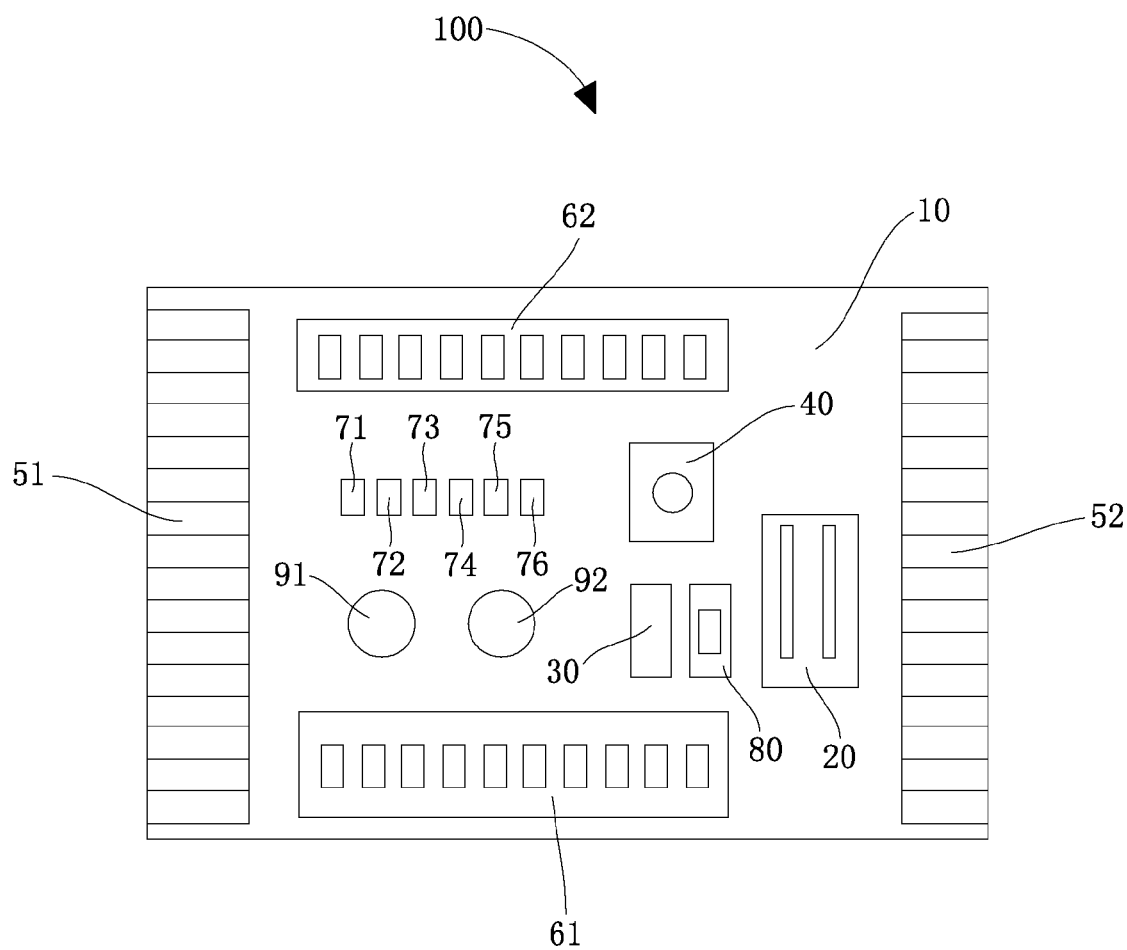
FIG. 1 is a schematic view of the signal panel for checking the images displayed on the liquid crystal device in accordance with one embodiment.

FIG. 1 is a schematic view of the signal panel for checking the images displayed on the liquid crystal device in accordance with one embodiment.

Referring to FIG. 1, the signal panel for checking the images displayed on the liquid crystal device (hereinafter referred to as the "signal panel 100") includes a power supply mainboard 10, a first low voltage differential signaling plug 51, a second low voltage differential signaling plug 52, a first low voltage differential signaling adapter 61, a second low voltage differential signaling adapter 62, and a first, second, third, fourth, fifth, and sixth frequency-angle adjusting switches of the low voltage differential signals 71, 72, 73, 74, 75, and 76. The number of the low voltage differential signaling plugs, low voltage differential signaling adaptors, and the frequency adjusting switches of the low voltage differential signals are only examples illustrated in the accompanying figures.

Specifically, the power supply mainboard 10 may be a Printed Circuit Board (PCB) serving as a supporting body of electrical components. In addition, the power supply mainboard 10 electrically connects to the electrical components so as to supply power to the electrical components when a power source is connected.

In the embodiment, in order to engage the signal panel 100 with the LCD to be tested, the first low voltage differential signaling plug 51, the second low voltage differential signaling plug 52, the first low voltage differential signaling adapter 61, and the second low voltage differential signaling adapter 62 are preferably arranged on lateral sides of the power supply mainboard 10.

Specifically, the first low voltage differential signaling plug 51 and the second low voltage differential signaling plug 52 are symmetrically arranged on a left lateral side and a right lateral side of the power supply mainboard 10. The first low voltage differential signaling plug 51 is arranged on the left lateral side of the power supply mainboard 10, and the second low voltage differential signaling plug 52 is arranged on the right lateral side of the power supply mainboard 10. The first low voltage differential signaling plug 51 and the second low voltage differential signaling plug 52 may engage with low voltage differential signaling sockets of liquid crystal devices capable of directly engaging with the low voltage differential signaling plugs. In the embodiment, the first low voltage differential signaling plug 51 may engage with low voltage differential signaling sockets of large-scale liquid crystal devices, such as 48 inches or 55 inches, capable of directly engaging with the low voltage differential signaling plugs. The second low voltage differential signaling plug 52 may engage with low voltage differential signaling sockets of small-scale liquid crystal devices, such as 19 inches or 21 inches, capable of directly engaging with the low voltage differential signaling plugs. In one embodiment, the signal panel may include more low voltage differential signaling plugs according to real scenario.

The first low voltage differential signaling adapter 61 and the second low voltage differential signaling adapter 62 are arranged symmetrically on an up lateral side and a down lateral side of the power supply mainboard 10. The first low voltage differential signaling adapter 61 is arranged on the up lateral side of the power supply mainboard 10, and the second low voltage differential signaling adapter 62 is arranged on the down lateral side of the power supply mainboard 10. The first low voltage differential signaling adapter 61 and the second low voltage differential signaling adapter 62 engage with low voltage differential signaling inlets of the liquid crystal device via low voltage differential signaling adapters (not shown). The low voltage differential signaling adaptor is one typical low voltage differential signaling adaptor. In addition, the signal panel may include more low voltage differential signaling adaptors according to real scenario.

The first frequency-angle adjusting switch of the low voltage differential signals 71, the second frequency-angle adjusting switch of the low voltage differential signals 72, the third frequency-angle adjusting switch of the low voltage differential signal 73, the fourth frequency-angle adjusting switch of the low voltage differential signal 74, the fifth fourth frequency-angle adjusting switch of the low voltage differential signal 75, and the sixth fourth frequency-angle adjusting switch of the low voltage differential signal 76 are arranged in a row between the first low voltage differential signaling adapter 61 and the second low voltage differential signaling adapter 62 on the power supply mainboard 10. In addition, the above-mentioned switches are arranged close to the first low voltage differential signaling plug 51. The first frequency-angle adjusting switch of the low voltage differential signals 71, the second frequency-angle adjusting switch of the low voltage differential signals 72, the third frequency-angle adjusting switch of the low voltage differential signal 73, the fourth frequency-angle adjusting switch of the low voltage differential signal 74, the fifth fourth frequency-angle adjusting switch of the low voltage differential signal 75, and the sixth fourth frequency-angle adjusting switch of the low voltage differential signal 76 are for adjusting the frequency-angle parameters of the low voltage differential signals needed for the liquid crystal device according to the frequency of the power supply.

Furthermore, the signal panel 100 includes a power inlet 20, a voltage converting switch 30, and a power switch 40.

The power inlet 20 is arranged on the power supply mainboard 10 for receiving the external voltage, such as 12V. The external voltage operates as a power source of the power supply mainboard 10 for supplying the power to the electrical components arranged on the power supply mainboard 10 such that the electrical components can function normally.

The voltage converting switch 30 is arranged on the power supply mainboard 10 for converting the external voltage when the voltage converting switch 30 is turn on. In the embodiment, the voltage converting switch 30 converts the external voltage from 12V to 3.3V when the voltage converting switch 30 is turn on.

The power switch 40 is arranged on the power supply mainboard 10 for turning on or off the power of the signal panel 100. For example, when the power switch 40 is turn on, the signal panel 100 supplies the power to the electrical components on the power supply mainboard 10 by the external voltage received via the power inlet 20 such that the electrical components can operate normally. When the power switch 40 is turn off, the signal panel 100 stops supplying the power to the electrical components on the power supply mainboard 10 such that the electrical components stops their operations.

Furthermore, the signal panel 100 includes a power safety unit 80 arranged on the power supply mainboard 10 so as to prevent the signal panel 100 from voltage overload or short connection. In one embodiment, the power insurance unit 80 may be fuse.

In addition, in order to ensure whether the power switch 40 is turn off, the signal panel 100 further includes a power lamp 91 arranged on the power supply mainboard 10. The turn-on power lamp 91 represents that the power switch 40 is turn on, and the turn-off power lamp 91 represents that the power switch 40 is turn off.

In addition, in order to ensure whether the power inlet 20 has received the external voltage, the signal panel 100 further includes a power-in indicator 92 arranged on the power supply mainboard 10. The turn-on power-in indicator 92 indicates that the power inlet 20 has received the external voltage, and the turn-off power-in indicator 92 indicates that the power inlet 20 has not received the external voltage.

In the embodiment, to facilitate the operators' operation toward the signal panel 100, the power switch 40 is arranged between the first frequency-angle adjusting switch of the low voltage differential signals 71, the second frequency-angle adjusting switch of the low voltage differential signals 72, the third frequency-angle adjusting switch of the low voltage differential signal 73, the fourth frequency-angle adjusting switch of the low voltage differential signal 74, the fifth fourth frequency-angle adjusting switch of the low voltage differential signal 75, the sixth fourth frequency-angle adjusting switch of the low voltage differential signal 76 and the second low voltage differential signaling plug 52 arranged on the right lateral side of the power supply mainboard 10. The power inlet 20 is arranged between the power switch 40 and the second low voltage differential signaling plug 52, which is arranged on the right-lateral side of the power supply mainboard 10. The voltage converting switch 30 is arranged between the power switch 40 and the first low voltage differential signaling adapter 61, which is arranged on the down lateral side of the power supply mainboard 10. The power lamp 91 is arranged between the first frequency-angle adjusting switch of the low voltage differential signals 71, the second frequency-angle adjusting switch of the low voltage differential signals 72, the third frequency-angle adjusting switch of the low voltage differential signal 73, the fourth frequency-angle adjusting switch of the low voltage differential signal 74, the fifth fourth frequency-angle adjusting switch of the low voltage differential signal 75, the sixth fourth frequency-angle adjusting switch of the low voltage differential signal 76 and the first low voltage differential signaling adapter 61, which is arranged on the down lateral side of the power supply mainboard 10. In addition, the power lamp 91 is arranged close to the first low voltage differential signaling plug 51, which is arranged on the left lateral side of the power supply mainboard 10. The power-in indicator 92 is arranged between the power lamp 91 and the voltage converting switch 30. The power safety unit 80 is arranged between the voltage converting switch 30 and the second low voltage differential signaling plug 52, which is arranged on the right lateral side of the power supply mainboard 10.

The circuits adopted by the signal panel 100 will be described hereinafter.

Figure 2:
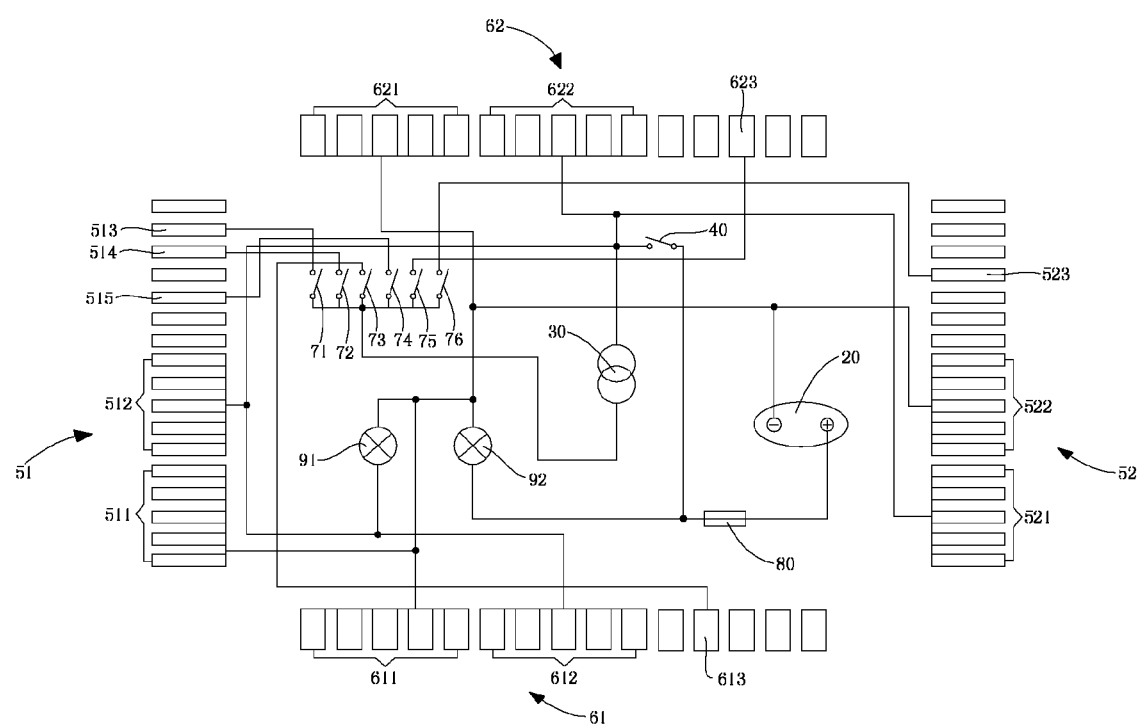
FIG. 2 is a circuit diagram of the signal panel for checking the images displayed on the liquid crystal device in accordance with one embodiment.

FIG. 2 is a circuit diagram of the signal panel for checking the images displayed on the liquid crystal device in accordance with one embodiment.

Referring to FIG. 2, the first low voltage differential signaling plug 51, the second low voltage differential signaling plug 52, all of the first low voltage differential signaling adapter 61, and the second low voltage differential signaling adapter 62 include a plurality of sheets. The sheets for electrically connecting with the low voltage differential signaling sockets or the sockets of the low voltage differential signaling adaptors of the liquid crystal device when the first low voltage differential signaling plug 51 or the second low voltage differential signaling plug 52 directly engages with the low voltage differential signaling sockets of the liquid crystal device or when the first low voltage differential signaling adapter 61 and the second low voltage differential signaling adapter 62 directly engage with the low voltage differential signaling sockets of the liquid crystal device via the low voltage differential signaling adaptor. The driving voltage for each of the sheets may be 3.3V. The number of the sheets for directly engaging with the low voltage differential signaling sockets of the liquid crystal device or the low voltage differential signaling sockets of the low voltage differential signaling adaptor may be different due to the different power frequency. For example, as the power frequency for large-scale liquid crystal device capable of engaging with the low voltage differential signaling plugs is higher, more sheets have be configured. Similarly, as the power frequency for small-scale liquid crystal device capable of engaging with the low voltage differential signaling plugs is lower, less sheets have to be configured. In addition, usually, the sheets have to assembled to be a sheet set so as to provide the driving voltage to the liquid crystal device needing a higher power frequency.

In the embodiment, each of the first low voltage differential signaling plug 51, the second low voltage differential signaling plug 52, the first low voltage differential signaling adapter 61, and the second low voltage differential signaling adapter 62 includes two sheet sets, and each of the sheet set includes five sheets connected in parallel. The driving voltage of each sheet set is 12V.

The positive-in socket of the power inlet 20 electrically connects to one end of the power safety unit 80. The other end of the power safety unit 80 electrically connects to one end of the power switch 40 and connects to one end of the power-in indicator 92. The other end of the power-in indicator 92 electrically connects to a first sheet set 621 of the second low voltage differential signaling adapter 62, electrically connects to one end of the power lamp 91, electrically connects to the first sheet set 611 of the first low voltage differential signaling adapter 61, and the first sheet set 511 of the first low voltage differential signaling plug 51. The other end of the power lamp 91 electrically connects to a second sheet set 612 of the first low voltage differential signaling adapter 61, the second sheet set 512 of the first low voltage differential signaling plug 51, and the other end of the power switch 40. A negative-in socket of the power inlet 20 electrically connects to a second sheet set 522 of the second low voltage differential signaling plug 52, and the other end of the power-in indicator 92. One end of the voltage converting switch 30 electrically connects to the other end of the power switch 40, the first sheet set 521 of the second low voltage differential signaling plug 52, and the second sheet set 622 of the second low voltage differential signaling adapter 62. One end of the first frequency-angle adjusting switch of the low voltage differential signals 71, one end of the second frequency-angle adjusting switch of the low voltage differential signals 72, one end of the third frequency-angle adjusting switch of the low voltage differential signal 73, one end of the fourth frequency-angle adjusting switch of the low voltage differential signal 74, one end of the fifth fourth frequency-angle adjusting switch of the low voltage differential signal 75, and one end of the sixth fourth frequency-angle adjusting switch of the low voltage differential signal 76 electrically connect to the other end of the voltage converting switch 30. The other end of the first frequency-angle adjusting switch of the low voltage differential signals 71 electrically connects to a first sheet 513 of the first low voltage differential signaling plug 51. The other end of the second frequency-angle adjusting switch of the low voltage differential signals 72 electrically connects to a second sheet 514 of the first low voltage differential signaling plug 51. The other end of the fourth frequency-angle adjusting switch of the low voltage differential signal 74 electrically connects to a third sheet 515 of the first low voltage differential signaling plug. The other end of the third frequency-angle adjusting switch of the low voltage differential signal 73 electrically connects to the first sheet 613 of the first low voltage differential signaling adapter 61. The other end of the fifth fourth frequency-angle adjusting switch of the low voltage differential signal 75 electrically connects to the first sheet 623 of the second low voltage differential signaling adapter 62. The other end of the sixth fourth frequency-angle adjusting switch of the low voltage differential signal 76 electrically connects to the first sheet 523 of the second low voltage differential signaling plug 52.

As stated above, the first frequency-angle adjusting switch of the low voltage differential signals 71, the second frequency-angle adjusting switch of the low voltage differential signals 72, the third frequency-angle adjusting switch of the low voltage differential signal 73, the fourth frequency-angle adjusting switch of the low voltage differential signal 74, the fifth fourth frequency-angle adjusting switch of the low voltage differential signal 75 and the sixth fourth frequency-angle adjusting switch of the low voltage differential signal 76 are for adjusting the frequency-angle parameters of the low voltage differential signals needed for the liquid crystal device according to the frequency of the power supply.

For example, when the signal panel 100 performs the testing for the 55-inches liquid crystal device, which may directly engage with the low voltage differential signaling plugs, the first low voltage differential signaling plug 51 engages with the low voltage differential signaling sockets of the liquid crystal device. As the 55-inches liquid crystal device needs a higher power frequency, and the first frequency-angle adjusting switch of the low voltage differential signals 71, the second frequency-angle adjusting switch of the low voltage differential signals 72, the third frequency-angle adjusting switch of the low voltage differential signal 73, and the fourth frequency-angle adjusting switch of the low voltage differential signal 74 are turn on.

When the signal panel 100 performs the testing for the 48-inches liquid crystal device, which may directly engage with the low voltage differential signaling plugs, the first low voltage differential signaling plug 51 of the signal panel 100 engages with the low voltage differential signaling sockets of the liquid crystal device. As the power frequency of the 48-inch liquid crystal device is lower than that of the 55-inch liquid crystal device, and thus only the first frequency-angle adjusting switch of the low voltage differential signals 71 and the second frequency-angle adjusting switch of the low voltage differential signals 72 are turn on.

The testing process performed by the signal panel 100 toward the 55-inch liquid crystal device will be described hereinafter.

The high-temperature/aging and quality reliability experiments of the 55-inch liquid crystal device capable of engaging with the low voltage differential signaling socket will be described with reference to FIGS. 1 and 2. First, the first frequency-angle adjusting switch of the low voltage differential signals 71, the second frequency-angle adjusting switch of the low voltage differential signals 72, and the fourth frequency-angle adjusting switch of the low voltage differential signal 74 of the signal panel 100 are turn on so as to obtain the needed power frequency for the liquid crystal device capable of directly engaging with low voltage differential signaling plugs. Second, the power inlet 20 of the signal panel 100 receives the external voltage (12V), and the power-in indicator 92 lights up. In the end, the first low voltage differential signaling plug 51 of the signal panel 100 engages with the low voltage differential signaling socket of the liquid crystal device. The liquid crystal device capable of directly engaging with the low voltage differential signaling plugs is controlled to display the images or not via turning on or off the power switch 40.

In the above process, the external voltage (12V) is provided directly to the first sheet set 511 and the second sheet set 512 of the first low voltage differential signaling plug 51. The voltage converting switch 30 converts the external voltage (12V) to the voltage, i.e., 3.3V, needed for the first sheet 513, the second sheet 514, and the third sheet 515 of the first low voltage differential signaling plug 51.

In view of the above, the signal panel can test the liquid crystal device without using connecting wires and signal generators, which effectively reduce the cost. In addition, the signal panel assembles different low voltage differential signaling plugs and adaptors such that the liquid crystal devices with different dimension and models can be tested. In this way, the cost is reduced and the operation is easy.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A signal panel for checking images displayed on liquid crystal devices, comprising:
   a power supply mainboard;
   a plurality of low voltage differential signaling plugs arranged on the power supply mainboard for directly engaging with the low voltage differential signaling sockets of the liquid crystal device;
   a plurality of low voltage differential signaling adapters arranged on the power supply mainboard for engaging with the low voltage differential signaling sockets of the liquid crystal device via the adapters; and
   a plurality of frequency-angle adjusting switches of the low voltage differential signals arranged on the power supply mainboard for adjusting frequency-angle parameters of the low voltage differential signals of the liquid crystal device.

2. The signal panel as claimed in claim 1, wherein the plurality of low voltage differential signaling plugs are symmetrically arranged on a left lateral side and a right lateral side of the power supply mainboard.

3. The signal panel as claimed in claim 1, wherein the plurality of low voltage differential signaling adapters are arranged symmetrically on an up lateral side and a down lateral side of the power supply mainboard.

4. The signal panel as claimed in claim 2, wherein the plurality of low voltage differential signaling adapters are arranged symmetrically on an up lateral side and a down lateral side of the power supply mainboard.

5. The signal panel as claimed in claim 4, wherein the plurality of frequency-angle adjusting switches of the low voltage differential signals are arranged in a row between the low voltage differential signaling adapters located on the up lateral side and the down lateral side of the power supply mainboard, and the plurality of frequency-angle adjusting switches of the low voltage differential signals are arranged close to the low voltage differential signaling plug located on the left lateral side of the power supply mainboard.

6. The signal panel as claimed in claim 1, wherein the signal panel further comprises:
   a power inlet arranged on the power supply mainboard for receiving an external voltage;
   a power switch arranged on the power supply mainboard for turning on or off power of the signal panel; and
   a voltage converting switch arranged on the power supply mainboard for converting the external voltage when the voltage converting switch is turn on.

7. The signal panel as claimed in claim 6, wherein the signal panel further comprises:
   a power lamp arranged on the power supply mainboard for indicating whether the power switch is turn on; and
   wherein the turn-on power lamp indicates that the power switch is turn on.

8. The signal panel as claimed in claim 6, wherein the signal panel further comprises:
   a power-in indicator arranged on the power supply mainboard for indicating whether the power inlet has received the external voltage; and
   wherein the turn-on power-in indicator indicates that the power inlet has received the external voltage.

9. The signal panel as claimed in claim 6, wherein the signal panel further comprises a power safety unit arranged on the power supply mainboard for preventing the signal panel from voltage overload or short connection.

10. The signal panel as claimed in claim 5, wherein the signal panel further comprises:
    a power inlet arranged on the power supply mainboard for receiving an external voltage;
    a power switch arranged on the power supply mainboard for turning on or off power of the signal panel; and
    a voltage converting switch arranged on the power supply mainboard for converting the external voltage when the voltage converting switch is turn on.

11. The signal panel as claimed in claim 10, a power inlet arranged on the power supply mainboard for receiving an external voltage;
    a power switch arranged on the power supply mainboard for turning on or off power of the signal panel; and
    a voltage converting switch arranged on the power supply mainboard for converting the external voltage when the voltage converting switch is turn on.

12. The signal panel as claimed in claim 10, wherein the signal panel further comprises:
    a power-in indicator arranged on the power supply mainboard for indicating whether the power inlet has received the external voltage; and
    wherein the turn-on power-in indicator indicates that the power inlet has received the external voltage.

13. The signal panel as claimed in claim 11, wherein the signal panel further comprises:
    a power-in indicator arranged on the power supply mainboard for indicating whether the power inlet has received the external voltage; and
    wherein the turn-on power-in indicator indicates that the power inlet has received the external voltage.

14. The signal panel as claimed in claim 10, wherein the signal panel further comprises a power safety unit arranged on the power supply mainboard for preventing the signal panel from voltage overload or short connection.

15. The signal panel as claimed in claim 11, wherein the signal panel further comprises a power safety unit arranged on the power supply mainboard for preventing the signal panel from voltage overload or short connection.

16. The signal panel as claimed in claim 12, wherein the signal panel further comprises a power safety unit arranged on the power supply mainboard for preventing the signal panel from voltage overload or short connection.

17. The signal panel as claimed in claim 13, wherein the signal panel further comprises a power safety unit arranged on the power supply mainboard for preventing the signal panel from voltage overload or short connection.

18. The signal panel as claimed in claim 17, wherein the power switch is arranged between the frequency-angle adjusting switches arranged in a row manner and the low voltage differential signaling plug located on the right lateral side of the power supply mainboard, the power inlet is arranged between the power switch and the low voltage differential signaling plug located on the right lateral side of the power supply mainboard, the voltage converting switch is arranged between the power switch and the low voltage differential signaling adapter located on the down lateral side of the power supply mainboard, the power lamp is arranged between the frequency-angle adjusting switches of the low voltage differential signals arranged in a row manner and the low voltage differential signaling adapter located on the down lateral side of the power supply mainboard, the power lamp is arranged close to the low voltage differential signaling plug located on the left lateral side of the power supply mainboard, the power-in indicator is arranged between the power lamp and the voltage converting switch, and the power safety unit is arranged between the voltage converting switch and the low voltage differential signaling plug located on the right lateral side of the power supply mainboard.

19. The signal panel as claimed in claim 17, wherein a positive-in socket of the power inlet electrically connects to one end of the power safety unit, the other end of the power safety unit electrically connects to one end of the power switch and connects to one end of the power-in indicator, the other end of the power-in indicator electrically connects to a first sheet set of the second low voltage differential signaling adapter, electrically connects to one end of the power lamp, and electrically connects to a first sheet set of a first low voltage differential signaling adapter;

the other end of the power lamp electrically connects to a second sheet set of the first low voltage differential signaling adapter, electrically connects to the second sheet set of the first low voltage differential signaling plug, and electrically connects to the other end of the power switch;

a negative-in socket of the power inlet electrically connects to the second sheet set of the second low voltage differential signaling plug, and electrically connects to the other end of the power-in indicator;

one end of the voltage converting switch electrically connects to the other end of the power switch, electrically connects to the first sheet set of the second low voltage differential signaling plug, and electrically connects to the second sheet set of the second low voltage differential signaling adapter;

one end of the first frequency-angle adjusting switch of the low voltage differential signals, one end of the second frequency-angle adjusting switch of the low voltage differential signals, one end of the third frequency-angle adjusting switch of the low voltage differential signal, one end of the fourth frequency-angle adjusting switch of the low voltage differential signal, one end of the fifth fourth frequency-angle adjusting switch of the low voltage differential signal, and one end of the sixth fourth frequency-angle adjusting switch of the low voltage differential signal electrically connect to the other end of the voltage converting switch;

the other end of the first frequency-angle adjusting switch of the low voltage differential signals electrically connects to the first sheet of the first low voltage differential signaling plug;

the other end of the second frequency-angle adjusting switch of the low voltage differential signals electrically connects to the second sheet of the first low voltage differential signaling plug;

the other end of the fourth frequency-angle adjusting switch of the low voltage differential signal electrically connects to a third sheet of the first low voltage differential signaling plug;

the other end of the third frequency-angle adjusting switch of the low voltage differential signal electrically connects to the first sheet of the first low voltage differential signaling adapter;

the other end of the fifth fourth frequency-angle adjusting switch of the low voltage differential signal electrically connects to the first sheet of the second low voltage differential signaling adapter; and the other end of the sixth fourth frequency-angle adjusting switch of the low voltage differential signal electrically connects to the first sheet of the second low voltage differential signaling plug.

20. The signal panel as claimed in claim 18, wherein a positive-in socket of the power inlet electrically connects to one end of the power safety unit, the other end of the power safety unit electrically connects to one end of the power switch and connects to one end of the power-in indicator, the other end of the power-in indicator electrically connects to a first sheet set of the second low voltage differential signaling adapter, electrically connects to one end of the power lamp, and electrically connects to a first sheet set of a first low voltage differential signaling adapter;

the other end of the power lamp electrically connects to a second sheet set of the first low voltage differential signaling adapter, electrically connects to the second sheet set of the first low voltage differential signaling plug, and electrically connects to the other end of the power switch;

a negative-in socket of the power inlet electrically connects to the second sheet set of the second low voltage differential signaling plug, and electrically connects to the other end of the power-in indicator;

one end of the voltage converting switch electrically connects to the other end of the power switch, electrically connects to the first sheet set of the second low voltage differential signaling plug, and electrically connects to the second sheet set of the second low voltage differential signaling adapter;

one end of the first frequency-angle adjusting switch of the low voltage differential signals, one end of the second frequency-angle adjusting switch of the low voltage differential signals, one end of the third frequency-angle adjusting switch of the low voltage differential signal, one end of the fourth frequency-angle adjusting switch of the low voltage differential signal, one end of the fifth fourth frequency-angle adjusting switch of the low voltage differential signal, and one end of the sixth fourth frequency-angle adjusting switch of the low voltage differential signal electrically connect to the other end of the voltage converting switch;

the other end of the first frequency-angle adjusting switch of the low voltage differential signals electrically connects to the first sheet of the first low voltage differential signaling plug;

the other end of the second frequency-angle adjusting switch of the low voltage differential signals electrically connects to the second sheet of the first low voltage differential signaling plug;

the other end of the fourth frequency-angle adjusting switch of the low voltage differential signal electrically connects to a third sheet of the first low voltage differential signaling plug;

the other end of the third frequency-angle adjusting switch of the low voltage differential signal electrically connects to the first sheet of the first low voltage differential signaling adapter;

the other end of the fifth fourth frequency-angle adjusting switch of the low voltage differential signal electrically connects to the first sheet of the second low voltage differential signaling adapter; and the other end of the sixth fourth frequency-angle adjusting switch of the low voltage differential signal electrically connects to the first sheet of the second low voltage differential signaling plug.

* * * * *